(12) United States Patent
Taylor

(10) Patent No.: US 10,969,052 B2
(45) Date of Patent: *Apr. 6, 2021

(54) PIPE FITTINGS HAVING INTEGRATED THERMOPLASTIC WITH IMPROVED MELT-FLOW CHARACTERISTICS FOR CURED IN PLACE PIPE SYSTEMS AND ASSOCIATED METHOD OF USE

(71) Applicant: Infrastructure Technologies, LLC, Lafayette, CA (US)

(72) Inventor: Joseph Taylor, Brainerd, MN (US)

(73) Assignee: Infrastructure Technologies, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,008

(22) Filed: Feb. 2, 2019

(65) Prior Publication Data

US 2019/0249812 A1 Aug. 15, 2019

Related U.S. Application Data

(60) Provisional application No. 62/630,873, filed on Feb. 15, 2018.

(51) Int. Cl.
| | |
|---|---|
| *F16L 55/16* | (2006.01) |
| *F16L 55/165* | (2006.01) |
| *F16L 23/032* | (2006.01) |
| *F16L 23/024* | (2006.01) |
| *F16L 23/12* | (2006.01) |

(52) U.S. Cl.
CPC ......... *F16L 55/1654* (2013.01); *F16L 23/024* (2013.01); *F16L 23/032* (2013.01); *F16L 23/125* (2013.01); *F16L 55/1656* (2013.01)

(58) Field of Classification Search
CPC .............. F16L 55/1654; F16L 55/1656; F16L 23/024; F16L 23/032; F16L 23/125
USPC .......................................................... 138/98
See application file for complete search history.

(56) References Cited

U.S. PATENT DOCUMENTS

| | | | | |
|---|---|---|---|---|
| 6,708,729 | B1 * | 3/2004 | Smith ................. | F16L 55/1651 138/124 |
| 7,073,536 | B2 * | 7/2006 | Blackmore ......... | B29C 63/0069 138/97 |
| 9,086,183 | B2 * | 7/2015 | Fyfe ...................... | F16L 55/165 |
| 9,347,212 | B2 * | 5/2016 | Bichler .................... | E03F 7/12 |
| 9,353,900 | B2 * | 5/2016 | Bichler ............... | F16L 55/1656 |
| 2007/0003648 | A1 * | 1/2007 | Weatherby .......... | F16L 55/1653 425/11 |
| 2009/0194184 | A1 * | 8/2009 | Kiest, Jr. ............. | F16L 55/1656 138/98 |
| 2011/0083766 | A1 * | 4/2011 | Anders ............... | F16L 55/1651 138/98 |
| 2011/0297243 | A1 * | 12/2011 | Kiest, Jr. ............. | F16L 55/1645 137/15.08 |

(Continued)

*Primary Examiner* — Craig M Schneider
*Assistant Examiner* — David R Deal
(74) *Attorney, Agent, or Firm* — Carla Gannon Law

(57) ABSTRACT

A fitting including a tubular extension, flange with apertures, and interface there between is fused with surrounding cured in place pipe and subsequently connected with an adjoining fitting, to connect two segments of pipe in a pipeline. The tubular extension is sized and shaped to mate with the host pipe with which it is associated, and the flange is sized, shaped, and has an aperture pattern that corresponds with the fitting to which it will be attached.

4 Claims, 6 Drawing Sheets

(56) References Cited

U.S. PATENT DOCUMENTS

2012/0012217 A1* 1/2012 Hairston ............... B29C 63/346
                                                    138/98
2012/0312407 A1* 12/2012 Muhlin ................. F16L 55/179
                                                    138/98
2014/0116557 A1* 5/2014 Bichler .................. B32B 27/12
                                                    138/98
2015/0068632 A1* 3/2015 Onishi .................... B29C 63/34
                                                    138/97

* cited by examiner

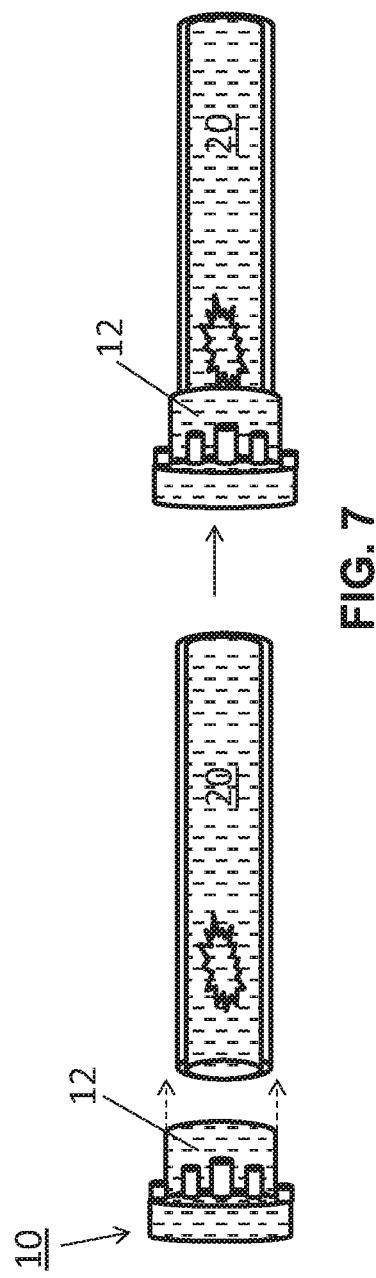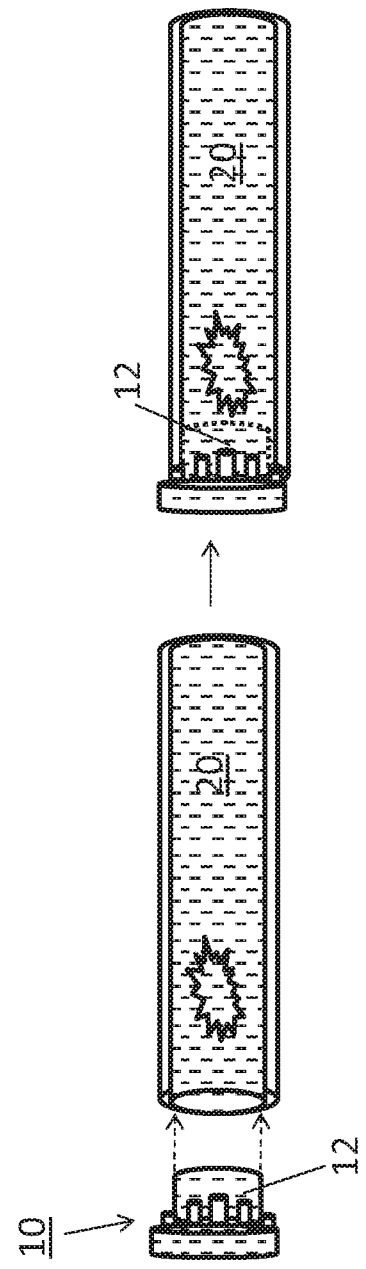

PIPE FITTINGS HAVING INTEGRATED THERMOPLASTIC WITH IMPROVED MELT-FLOW CHARACTERISTICS FOR CURED IN PLACE PIPE SYSTEMS AND ASSOCIATED METHOD OF USE

CROSS-REFERENCE TO RELATED APPLICATION

This application claims the priority of U.S. Provisional Patent Application Ser. No. 62/630,873, entitled PIPE FITTINGS HAVING INTEGRATED THERMOPLASTIC WITH IMPROVED HELT-FLOW CHARACTERISTICS FOR CURED IN PLACE PIPE SYSTEMS AND ASSOCIATED METHOD OF USE, which was filed Feb. 15, 2018. The aforementioned provisional application is hereby incorporated by reference in its entirety.

BACKGROUND OF THE INVENTION

The present invention relates to repairing and reinforcing segments of pipe in pipelines, and more specifically, to cured in place pipe fittings for use with cured in place pipe systems.

Pressure pipe systems are typically constructed of multiple pipe segments with each pipe segment having a pipe fitting at each terminal end. The pipe segments are connected end to end by joining and bolting pipe fittings one to another. With time and usage these segments become critically deteriorated or damaged and require repair and/or reinforcement. Replacing pipe segments can be achieved in a variety of ways including digging to access the pipe, removal of the old pipe, putting in new pipe, and tying new pipe into existing pipeline; and various trenchless pipe repair methods. Of the trenchless pipe repair systems, Cured In Place Pipe ("CIPP") technologies have shown great promise.

CIPP technology generally involves lining the inside of a damaged or deteriorated host pipe with a flexible substrate that has been impregnated with a liquid curing agent such as epoxy, then curing the wetted substrate with heat, pressure, UV, or the like.

An improved CIPP system developed by the inventor(s) of the current application is disclosed in U.S. patent application Ser. No. 15/614,852, filed Jun. 6, 2017, entitled CURED IN PLACE PIPE SYSTEM HAVING INTEGRATED THERMOPLASTIC WITH IMPROVED MELT-FLOW CHARACTERISTICS. This application claims the benefit of U.S. Provisional Patent Application 62/357,796, filed on Jul. 1, 2016. Both of these references are hereby incorporated by reference in their entirety.

The aforementioned improved CIPP system includes a flexible tubular substrate comprised of fibers of carbon, aramid and thermoplastic which have been needle punched together and formed in a tube of overlapping layers that can circumferentially expand to accommodate the size and shape of the host pipe. An outer plastic film encapsulates the tubular structure to protect it from contamination by the host pipe during installation. The thermoplastic has a melt/flow point of approximately 300-342° F., a cure point of approximately 330-370° F., and a bonding point of approximately 372-412° F. at approximately 5-20 psi.

In use, the uncured CIPP system is introduced into the host pipe, an internal bladder is pumped with hot air, the tubular substrate's thermoplastic melts, carbon and aramid fibers bond, and the thermoplastic cures. After curing, the bladder is removed, and ends of the cured lining system are cut. The result is a repaired and/or reinforced host pipe.

One issue with CIPP technologies, both conventional and the aforementioned improvement, is the reconnection of a CIPP enhanced host pipe to the existing pipes in a pipeline. More specifically, CIPP repair of pressure pipes typically requires rehabilitation of the entire pipe including fittings, then the possibility of cutting off the fittings, then installation of new fittings, after the insertion of CIPP enhanced segment back into the pipeline. Replacement fittings are difficult to install, and their failure rate is high.

FIG. 1 depicts a known method of repairing pipe segment 23 within pipeline 22. As shown in FIG. 1A, compromised portion 28 of host pipe 20 requires repair. FIG. 1B shows removal of damaged segment 23, including conventional fittings 25. In FIG. 1C, host pipe 20 has been repaired with CIPP 30, and fittings 25 are poised for attachment. FIG. 1D depicts attachment of fittings 25, with internal patch 60, typically epoxy laden fiberglass, wrapped around internal junction between host pipe, proximal end of fitting, and edge of CIPP. Next, external patch 62, typically epoxy laden fiberglass, is wrapped around exterior junction between host pipe and fitting. As shown in FIG. 1F, the entire assembly is then reinserted into the pipeline. Problems with this technique include difficulty in applying patches and in particular the internal patch, imperfect bonding, deterioration, flow disruption and leaking.

FIG. 2 depicts another known method of repairing pipe segment which is similar to the technique depicted in FIG. 1, except that instead of internal patch 60 and external patch 62, internal band 64 (see FIGS. 2C and 2D) and external band 66 (see FIGS. 2E and 2F) are employed. These bands are mechanically expandable rings that include a locking gasket. Problems with this technique include difficulty in installation, deterioration, flow disruption and leaking.

As can be seen, there is a need for improved fittings for use with CIPP enhanced pipe. It is desirable that these fittings are easy to install, irreversibly bond with the host pipe, are strong and resistant to deterioration, cause little resistance to flow, and don't leak. Methods for installing and using these improved fittings are also needed.

SUMMARY OF THE INVENTION

A pipe fitting is cured in situ, thereby fusing with surrounding cured in place pipe. The fitting is subsequently connected with an adjoining fitting, to connect two segments of pipe in a pipeline.

The fitting generally includes a tubular extension, a flange that defines a plurality of apertures, and an interface connecting the tubular extension to the flange. The tubular extension is sized and shaped to mate with the host pipe with which it is associated. Likewise, the flange is sized, shaped, and has an aperture pattern that corresponds with the fitting to which it will be attached. The dimensions the flange 10 can vary widely, depending on the application. Fittings and flanges of the present invention are preferably constructed of a substrate includes a plurality of carbon, aramid and thermoplastic fibers that are needle punched 34 together The manufacturing of fittings/blind flanges from a substrate first requires that different sizes are created. Next, the substrate is compressed and heated sufficiently to take the shape of the mold. Finally, the substrate is cooled back to room temperature and then removed from the mold.

In use, a pipeline including a pipe segment having a compromised portion in need of repair is identified. The conventional fittings from the terminal ends of the host pipe are excised, with the host pipe itself staying substantially in position.

The excision of the conventional fittings provides access points through which uncured CIPP can be fed into host pipe. The CIPP is cured using a heater which forces superheated air at a specific pressure and for a specific duration. The result is the host pipe internally lined with cured CIPP, thereby forming a repaired portion. Ends of CIPP extending beyond the host pipe are subsequently cut and removed.

The fittings are positioned onto terminal ends of CIPP-enhanced host pipe, then cured. The result is a CIPP-enhanced host pipe with cured in place fittings that bolted to fittings of adjoining pipe segments. Gaskets are positioned between corresponding fittings thereby forming a substantially inseparable structure that is strong, flexible, and resilient to leakage and deterioration.

BRIEF DESCRIPTION OF THE DRAWINGS

FIG. 1 depicts a known method of repairing a segment of pipe with:
FIG. 1A showing a pipeline including a segment of pipe in need of repair;
FIG. 1B showing removal of damaged segment;
FIG. 1C showing attachment of conventional fittings to ends of CIPP repaired host pipe;
FIG. 1D showing connection of conventional fittings to CIPP repaired host pipe and application of internal patch;
FIG. 1E showing application of external patch;
and
FIG. 1F showing introduction of repaired host pipe to pipeline;
FIG. 2 depicts another known method of repairing a segment of pipe with:
FIG. 2A showing a pipeline including a segment of pipe in need of repair;
FIG. 2B showing removal of damaged segment;
FIG. 2C showing removal of conventional fittings from ends of CIPP repaired host pipe and internal band ready for insertion;
FIG. 2D showing connection of conventional fittings to CIPP repaired host pipe and internal bands there within;
FIG. 2E showing external bands poised for positioning;
and
FIG. 2F showing external bands in position;
and
FIG. 2G showing introduction of repaired host pipe to pipeline;
FIG. 6 depicts a method of repairing a segment of pipe according to the present invention with:
FIG. 6A showing a pipeline including a segment of pipe in need of repair;
FIG. 6B showing removal of conventional fittings but with segment not removed;
FIG. 6C showing uncured CIPP within host pipe;
FIG. 6D showing cured CIPP within host pipe;
FIG. 6E showing fittings to be placed at each end of CIPP repaired host pipe;
and
FIG. 6F showing CIPP repaired host pipe with cured in place fittings;
FIG. 7 depicts a fitting having a female tubular extension;
and
FIG. 8 depicts a fitting a male tubular extension.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:
10—Fitting;
12—Tubular extension;
14—Flange;
16—Interface;
17—Apertures;
18—Proximal end;
19—Distal end;
20—Host pipe;
21—Bolts;
22—Pipeline;
23—Pipe segment;
24—Pipe junction;
25—Conventional fitting;
28—Compromised portion;
29—Repaired portion;
30—Cured In Place Pipe (CIPP);
31—Substrate;
32—Fibers;
34—Needle punch;
40—Heater;
42—Air;
60—Internal patch;
62—External patch;
64—Internal band;
66—External band; and
70—Blind flange.

Broadly, the present invention pertains to a fitting that is cured in situ, thereby fusing with surrounding cured in place pipe. The fitting is subsequently connected with an adjoining fitting, to connect two segments of pipe in a pipeline.

Figure 3:
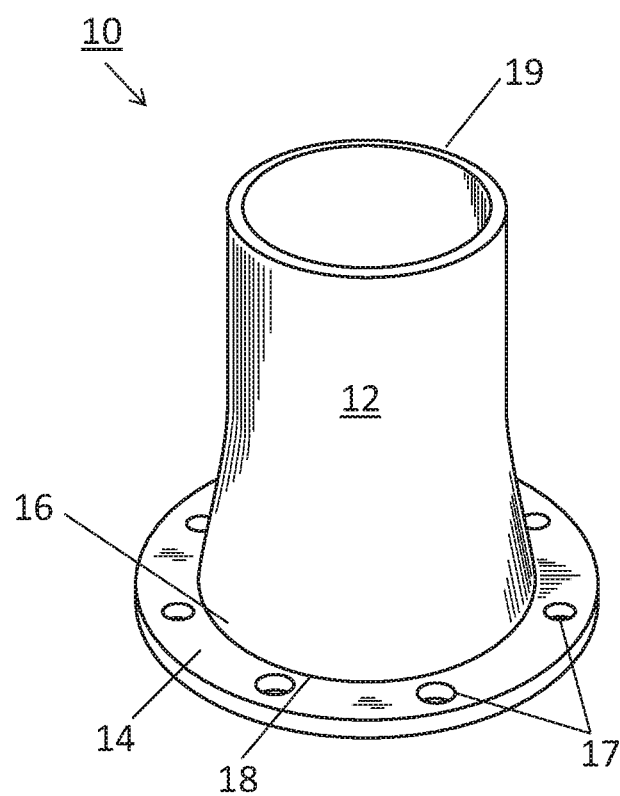
FIG. 3 is a photograph of a fitting of the present invention.

Fitting 10 of the present invention is depicted in FIG. 3, and generally includes tubular extension 12, flange 14 which defines a plurality of apertures 17, and interface 16 connecting tubular extension to flange. Tubular extension 12 is sized and shaped to mate with host pipe with which it is associated. Likewise, flange 17 is sized, shaped, and has an aperture pattern that corresponds with the fitting to which it will be attached. The fitting to which fitting 10 will be attached may be a conventional fitting, or fitting of the present invention. The dimensions of flange 10 can vary widely, depending on the application, with the following approximate dimensions being preferred: height of 0 to 20 ft; outer diameter at proximal end of 3" to 130"; outer diameter at distal end of 3" to 120"; inner diameter at proximal end of 2.5" to 110"; inner diameter at distal end of 2.5" to 110"; thickness of walls 0.125" to 10"; diameter of flange 5" to 150"; number of apertures 0 to 3; thickness of flange 0.125" to 6"; angle of transition between tubular portion and flange 0 to 180 degrees; and diameter of apertures 3" to 120".

Figure 4:
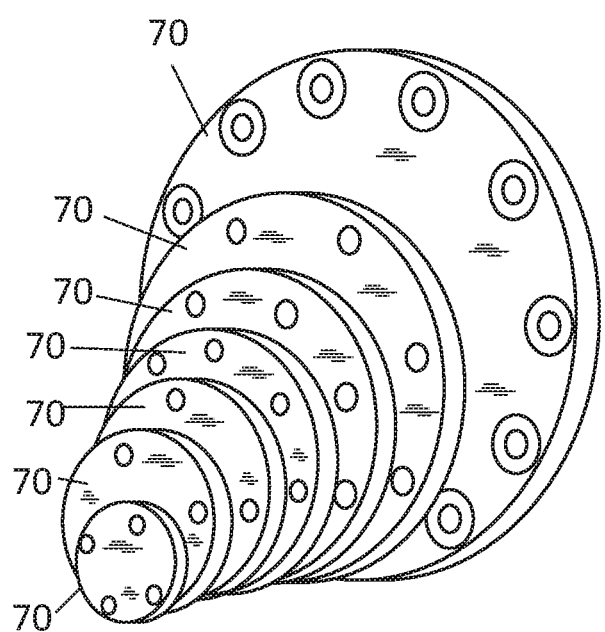
FIG. 4 is a photograph of 7 blind flanges of the present invention.

FIG. 4 is a photograph of seven blind flanges 70 according to the present invention. Blind flanges 70 are generally used in the industry as an "end cap" where a pipe's flow is cut off. The dimensions of blind flanges 70 can vary widely, depending on the application, but a diameter of approximately 3" to 120", and thickness of approximately 0.125" to 10" is generally preferred.

Figure 5:
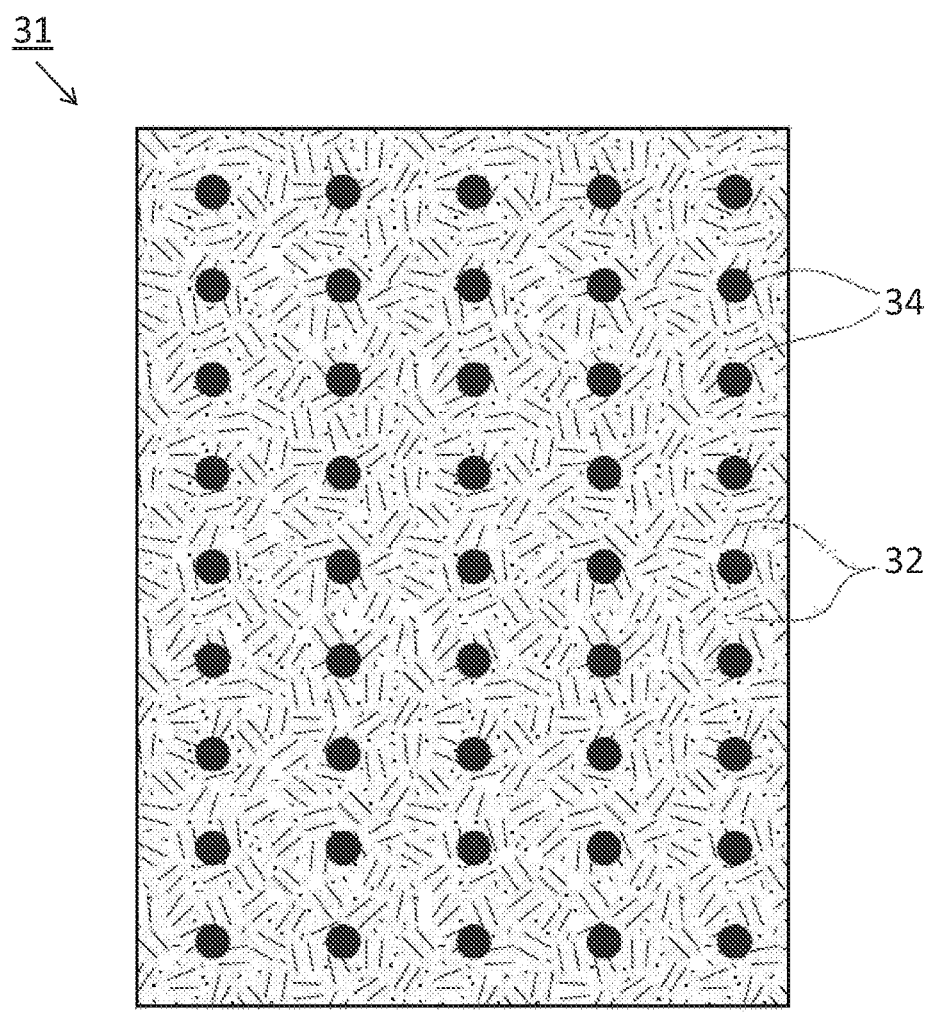
FIG. 5 depicts the substrate used to construct fittings of the present invention.

Fittings 10 and blind flanges 70 of the present invention are preferably constructed of substrate 31. Referring to FIG. 5, substrate 31 includes a plurality of carbon, aramid and thermoplastic fibers 32 needle punched 34 together, with each fiber being preferably approximately 1" to 4" long, and approximately 0.31 mm to 1 mm thick. An example of a commercially available carbon fiber suitable for use is Tenax UMS40 from Toho Tenax of Rockwood, Tenn. The aramid fibers preferably have a length of approximately 1" to 4", and thickness of approximately 0.31 mm to 1 mm. An example of a commercially available aramid fiber suitable for use is KEVLAR K29 AP from DuPont of North America. The thermoplastic fibers preferably have a length of approximately 6 mm to 2500 mm, and thickness of approximately 0.31 mm to 1 mm. The thermoplastic of the present invention is preferably polypropylene, with an example of a commercially available polypropylene thermoplastic being Hyperform HPN-68L from Milliken of Spartanburg, S.C., USA having approximately 309 to 400 degree melt and cure points at a pressure of approximately 5 to 20 psi. It should be understood that thermosetting materials are not desired since the fittings and blind flanges are cured during manufacturing, and subsequently cured in situ during installation. Thus, as used herein, "cured" shall mean melting and hardening or rehardening.

The proportion of carbon fibers in substrate 31 is approximately 10 to 60% by weight. The proportion of aramid fibers in substrate 31 is approximately 0 to 15% by weight. The preferred proportion of fibers in substrate 31 is approximately 40% carbon, 0% aramid, and 60% thermoplastic, by weight.

Fibers are needle punched 34 together by conventional methods in a directional format. However, other combinations are also suitable. Substrate 31 can be produced in a variety of thicknesses, typically approximately 1.5 mm-9.0 mm, as appropriate for the specific application.

The manufacturing of fittings/blind flanges from a substrate first requires that different sizes are created. Next, the substrate is compressed and heated sufficiently to take the shape of the mold. Finally, the substrate is cooled back to room temperature and then removed from the mold.

Figure 1:
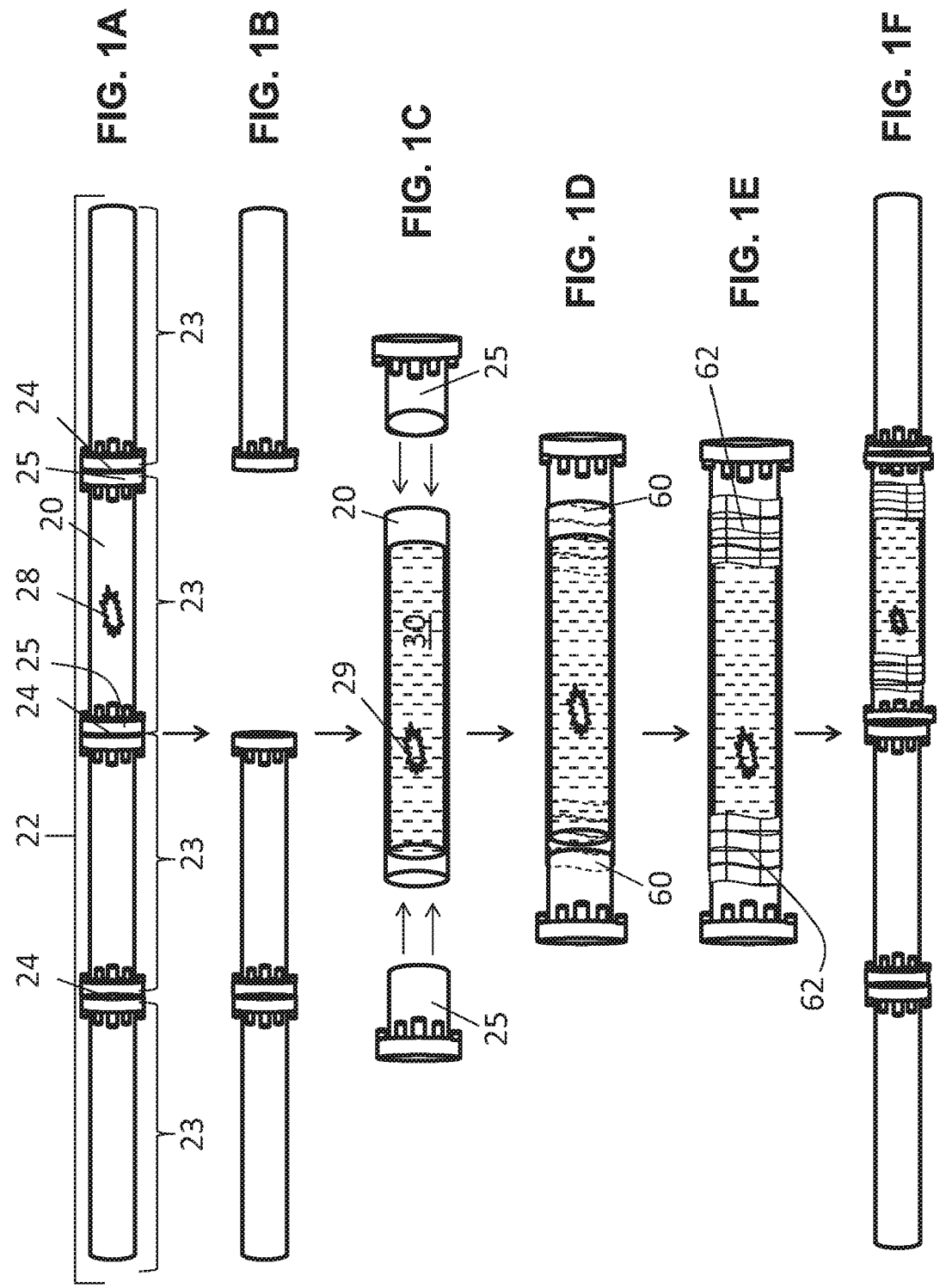
Figure 2:
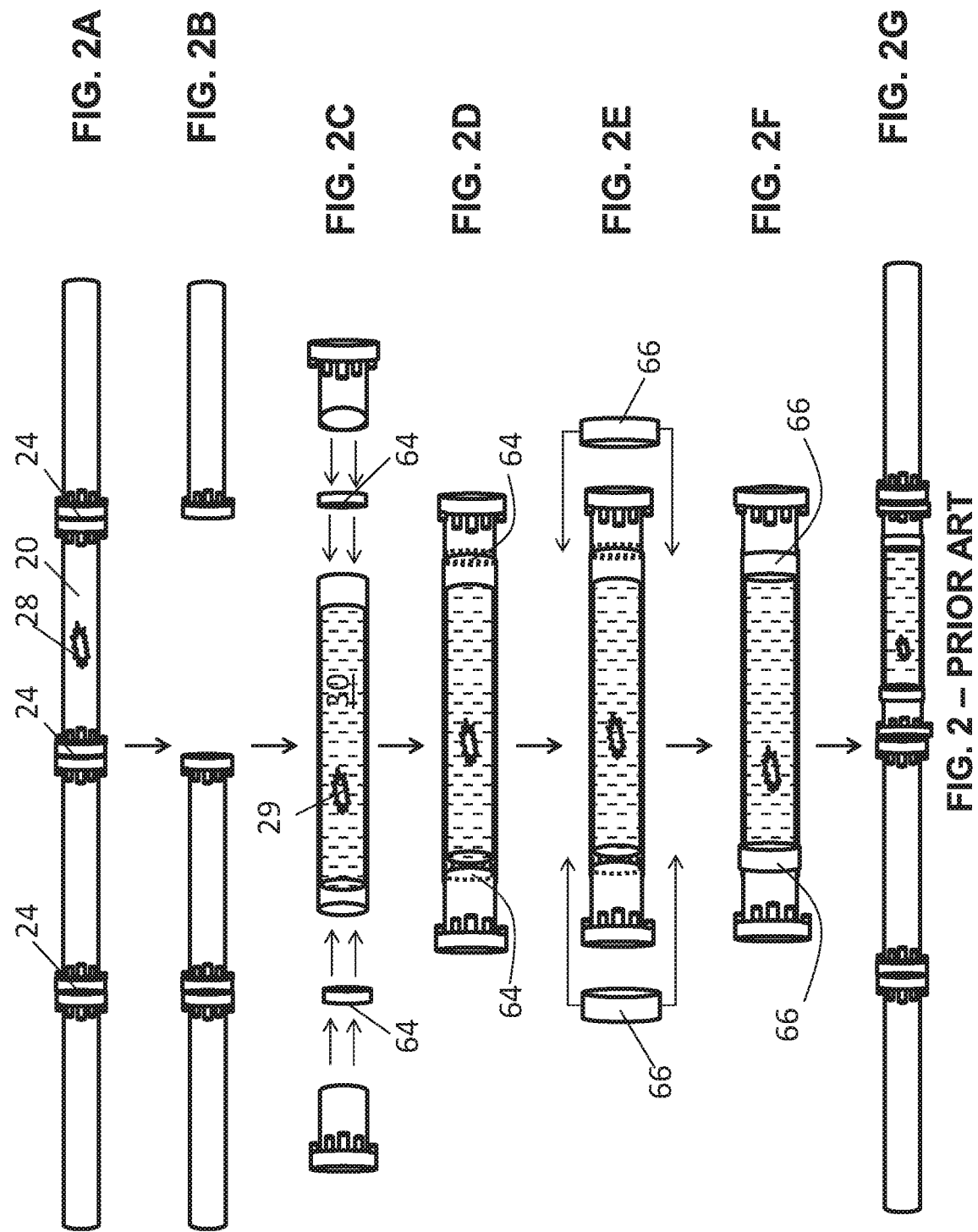
Figure 6:
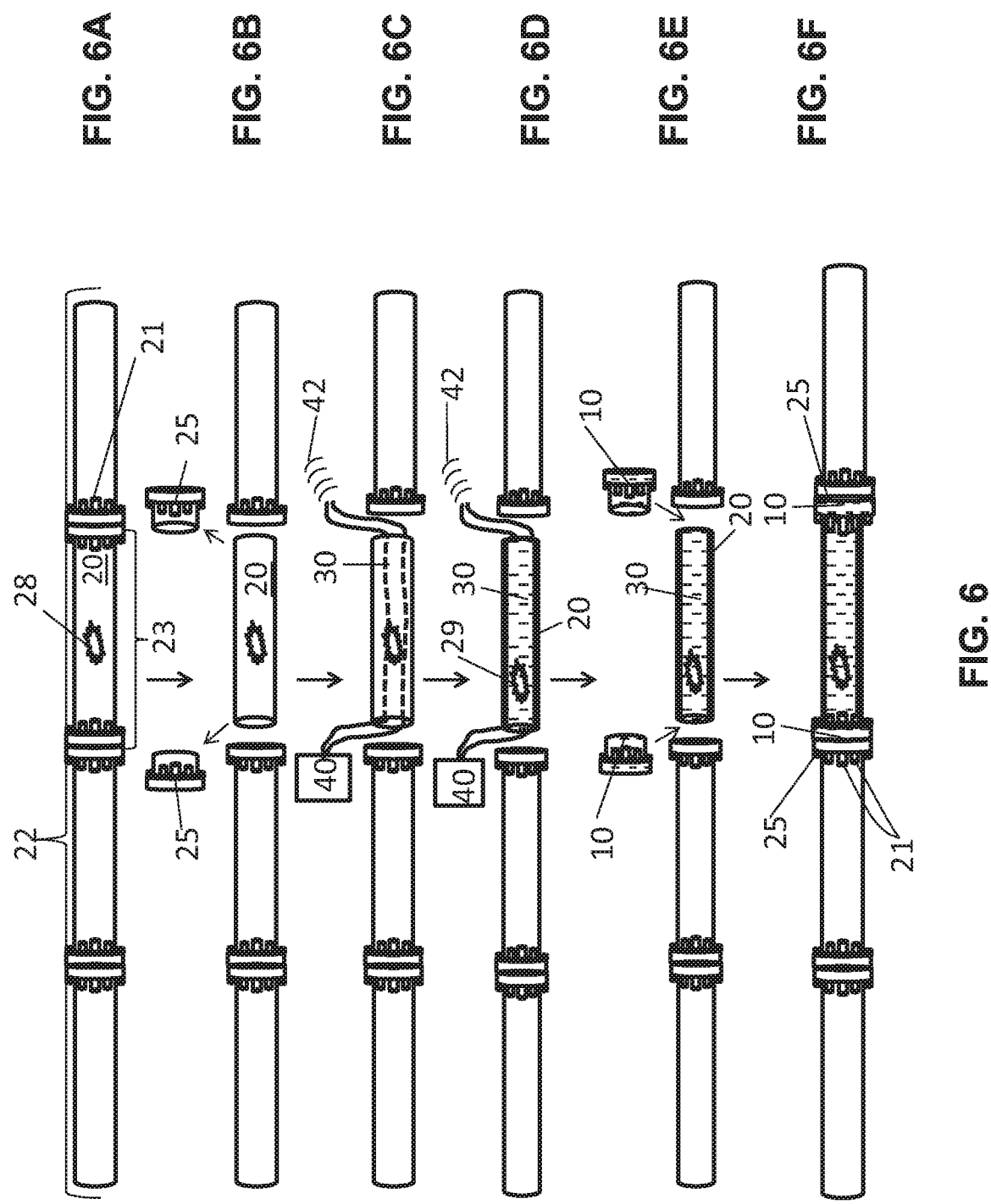

FIG. 6 depicts some of the critical steps in using fittings 10 of the present invention. FIG. 6A depicts pipeline 22 including pipe segment 23 having compromised portion 28 in need of repair. FIG. 6B depicts excision of conventional fittings 25 from terminal ends of host pipe 20 with host pipe itself staying substantially in position. This is preferably achieved by removing bolts, cutting terminal ends of pipe, and removing terminal end of pipe with corresponding half of conventional fitting 25. This is a difference and improvement over conventional methods where the entire pipe segment is removed, as depicted in FIGS. 1B and 2B. Removing only terminal ends with fittings saves a lot of time and labor because the entire pipe segment doesn't need to be "dug out" of the ground. Digging out a pipe segment can be particularly problematic where multiple pipelines are present in one area, as is often the situation.

As shown in FIG. 6C, excision of conventional fittings 25 provides access points through which uncured CIPP 30 can be fed into host pipe. As shown in FIG. 6D, CIPP 30 is cured using heater 40 which forces superheated air 42 at a specific pressure and for a specific duration. The result is host pipe 20 being internally lined with cured CIPP 30 thereby forming repaired portion 29. Although not shown, end of CIPP extending beyond host pipe are subsequently cut and removed.

As shown in FIG. 6E, fittings 10 are positioned onto terminal ends of CIPP-enhanced host pipe 20. Although not shown, fittings 10 are subsequently cured. It should be understood that specific configurations will vary according to project variables, but that the method will generally follow identical steps, including that the outer surface of fitting extension 12 and inner surface of liner 20 are reheated in order to fuse together. This configuration would be reversed if using a female-type fitting in order to achieve the desired flow of fluid in the pipe.

The finished product depicted in FIG. 6F is a CIPP-enhanced host pipe with cured in place fittings, bolted to fittings 25 or 10 of adjoining pipe segments 23. Preferably gaskets, not shown, are positioned between corresponding fittings 25, 10. The resulting CIPP and fitting are a substantially inseparable structure that is strong, flexible, and resilient to leakage and deterioration.

Referring to FIGS. 7 and 8, it should be understood that tubular extension 12 can engage with host pipe 20 in a female or male configuration, respectively. As would be understood by those in the art, the selection of female versus male configurations would depend on the direction the fluids within the pipeline are flowing, among other factors.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, modifications may be made without departing from the spirit and scope of the invention as set forth in the following claims. It should be understood that all specifications, unless otherwise stated or contrary to common sense, are +/−10%, and that ranges of values set forth inherently include those values, as well as all increments between. Also it should be understood that "substantially" and the like should be construed to mean generally, but allowing for irregularities due to material or manufacturing differences, human variances, and so forth.

What is claimed is:

1. An uncured fitting for use with a CIPP having needle punched tubular substrate including a plurality of integrated thermoplastic fibers, said tubular substrate constructed of multiple overlapping layers that aren't attached one to another, said uncured fitting comprised of a fitting substrate having a tubular extension joined with a flange at an interface, said fitting substrate constructed of plurality of carbon fibers, aramid fibers and thermoplastic fibers needle punched together, wherein said fitting substrate is curable upon the application of blown air at approximately 380-470° F., at a pressure of approximately 5-20 psi, for approximately 5 to 90 minutes, and wherein said tubular substrate and said fitting substrate are chemically and structurally bonded upon curing.

2. A pipe repair system including a CIPP chemically and structurally bonded with a fitting, said CIPP including:
   A. A needle punched tubular substrate including a plurality of integrated thermoplastic fibers, said tubular substrate constructed of multiple overlapping layers that aren't attached one to another;
   B. A bladder surrounding said tubular substrate; and
   C. A film surrounding said tubular substrate, and wherein said CIPP and said fitting are constructed of substantially identical materials.

3. A method of repairing a pipe including the steps of:
   A. Inserting an uncured CIPP into a pipe segment having a compromised portion, said CIPP including a needle punched tubular substrate including a plurality of integrated thermoplastic fibers, said tubular substrate constructed of multiple overlapping layers that aren't attached one to another; a bladder surrounding said tubular substrate; and a film surrounding said tubular substrate;
B. Curing said CIPP;
C. Positioning at least one fitting onto a distal end of said pipe segment;
D. Curing said fitting by blowing air at approximately 380-470° F., at a pressure of approximately 5-20 psi, for approximately 5 to 90 minutes; and;
E. Connecting said fitting to an adjacent corresponding fitting.

4. The method of claim 3 wherein said step of positioning at least one fitting onto a distal end of said pipe segment includes the step of positioning at least one fitting constructed of a substantially identical material as said CIPP.

* * * * *